Oct. 28, 1930.  M. E. WAGNER  1,780,101
OIL AND GAS SEPARATOR
Filed Feb. 20, 1928
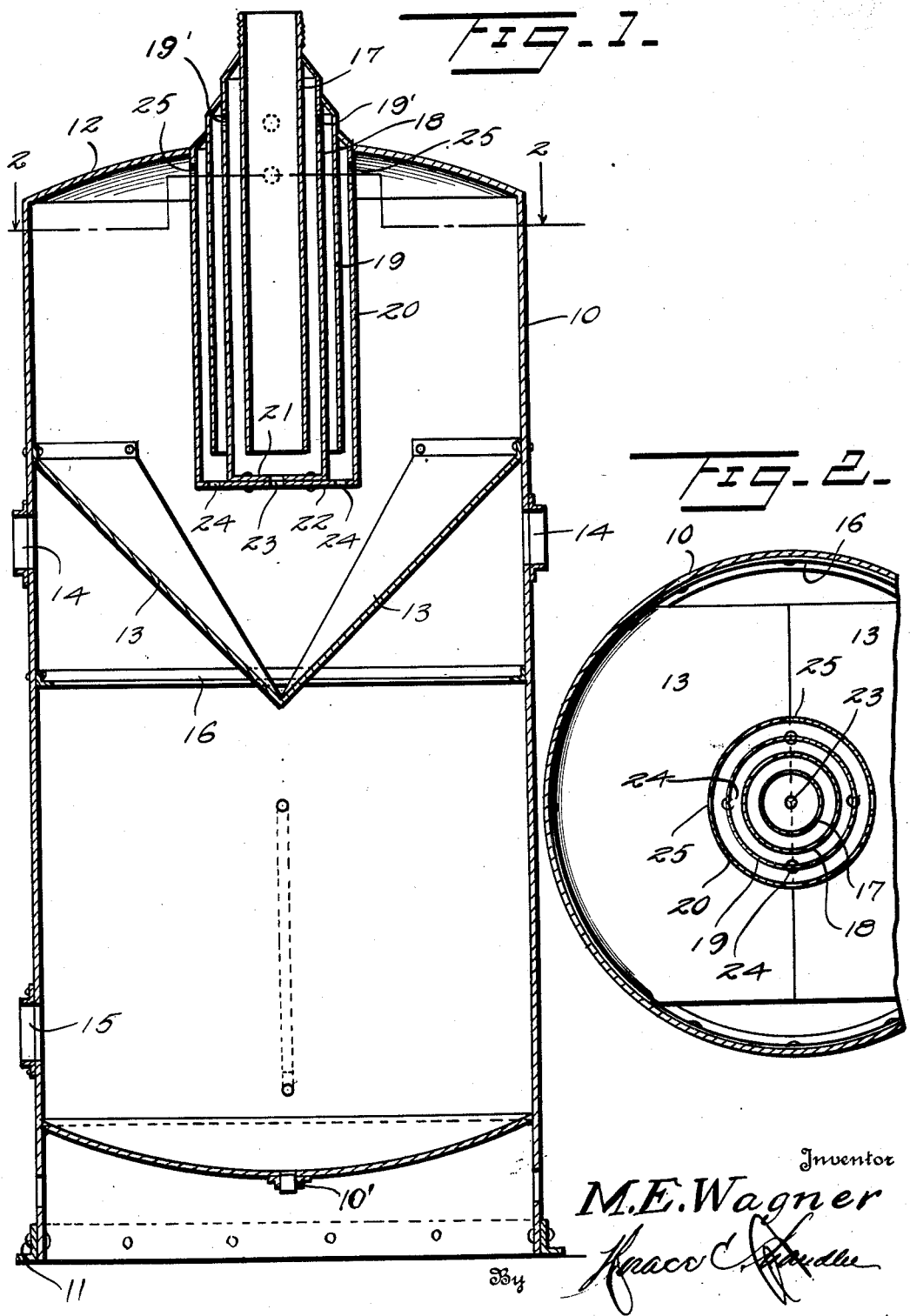

Patented Oct. 28, 1930

1,780,101

UNITED STATES PATENT OFFICE

MYRON E. WAGNER, OF TULSA, OKLAHOMA

OIL AND GAS SEPARATOR

Application filed February 20, 1928. Serial No. 255,764.

This invention relates to new and useful improvements in separators, and particularly to oil and gas separators.

One object of the invention is to provide a novel and improved separator by means of which the gas may be quickly and efficiently separated from the oil, and delivered to any desired point of use.

Another object is to provide a separator of this character wherein such oil, as may pass with the gas, may be drained back into the tank or receptacle in which the separating means are located.

Another object is to locate the separating device, within the tank, that the exit of the gas will be facilitated.

Other objects and advantages will be apparent from the following description when taken in connection with the accompanying drawing.

In the drawing:

Figure 1 is a vertical sectional view through a tank equipped with the improved oil and gas separator.

Figure 2 is a horizontal sectional view on the line 2—2 of Figure 1.

Referring particularly to the accompanying drawing, 10 represents a tank of suitable size and proportions, which is supported on the base 11, and has the convex cover 12 secured on its upper end. Secured within the tank, to opposite points on the walls thereof, and converging downwardly, are the baffle plates 13, and formed in opposite sides of the tank, immediately below the upper attached end of each of the baffle plates is an opening 14, through which oil and gas enters the tank, such oil striking the baffle plate and being deflected downwardly toward the bottom of the tank, to break up the oil and start the separation of the gas from the oil. The baffle plates are of less width than the tank whereby to provide spaces at the sides thereof through which the gas, separated from the oil, may pass to the upper portion of the tank. In the bottom of the tank is an opening 10', by which sediment may be drained, while in the side of the tank, at a suitable distance above the bottom thereof, is an outlet opening 15, for the oil. Secured to the inner face of the wall of the tank, below the oil inlet openings 14 is a flange 16, which serves to prevent upward creeping of the oil, on the sides of the tank.

Secured within the center of the cover 12, and depending into the tank, are the concentrically arranged, and properly spaced tubes 18, 19, and 20, and an innermost open-ended pipe 17, the latter tube 20 being the outermost tube. The lower ends of the tubes 18 and 20 are provided with the bottom walls 21 and 22, respectively, and the lower ends of the pipe 17 and the tube 19 are spaced a suitable distance above the said bottom walls 21 and 22. In said walls 21 and 22, respectively, directly below the lower ends of the tubes 18 and 20, are the oil drain openings 23 and 24, which permit return to the tank of such oil as may be carried up with the gas. At regularly spaced intervals in the side of the tube 20, adjacent the upper end, are the gas outlet openings 25, and in the upper portion of the tube 18 are similar openings 19', whereby a tortuous passage is provided through the tubes, from the tank to the upper discharge end of the central pipe 17.

What is claimed is:

An oil and gas separator including a tank into which oil and gas are admitted, and an outlet for the gas, said outlet including a plurality of concentrically arranged tubes, and an open-ended pipe within the innermost tube having its outer end arranged to discharge the gas, said tubes having their outer ends closed and connected together, the outer end of the innermost tube being closed against said pipe, the outer end of the wall of each alternate tube having an opening the innermost and the outermost of the tubes having their inner ends terminating beyond the other tubes and each having connecting walls, said walls having oil drainage openings.

In testimony whereof, I affix my signature.

MYRON E. WAGNER.